United States Patent [19]

Boots

[11] Patent Number: 4,615,236
[45] Date of Patent: Oct. 7, 1986

[54] CRANK DEVICE FOR AN OPEN ROOF CONSTRUCTION FOR A VEHICLE

[75] Inventor: Robert T. Boots, Haarlem, Netherlands

[73] Assignee: Vermeulen-Hollandia Octrooien II B.V., EA Haarlem, Netherlands

[21] Appl. No.: 689,869

[22] Filed: Jan. 9, 1985

[30] Foreign Application Priority Data

Jan. 11, 1984 [NL] Netherlands ............... 8400094

[51] Int. Cl.⁴ ................................................. G05G 1/04
[52] U.S. Cl. ................................. 74/545; 16/110 R; 74/547; 296/223; 403/4; 403/330
[58] Field of Search ............... 16/110 R, 112, 121, 16/123, 126; 74/545, 547; 296/221, 223; 403/4, 33, 330

[56] References Cited

U.S. PATENT DOCUMENTS

| | | | |
|---|---|---|---|
| 3,148,913 | 9/1964 | Golde | 296/223 |
| 3,383,945 | 5/1968 | Carella | 74/547 |
| 3,976,325 | 8/1976 | Schatzler | 296/223 |
| 4,023,858 | 5/1977 | Bienert et al. | 296/221 |
| 4,162,805 | 7/1979 | Hirschberger | 296/223 |
| 4,222,602 | 9/1980 | Kouth | 74/547 |
| 4,294,134 | 10/1981 | Mori et al. | 74/547 |

Primary Examiner—George L. Walton
Attorney, Agent, or Firm—Pahl, Lorusso & Loud

[57] ABSTRACT

The invention relates to a crank device comprising a crank and adapted to rotate an at least approximately vertical driving shaft, which may actuate a displaceable panel of an open roof construction for a vehicle. According to the invention a coupling member is mounted between the crank and the driving shaft and after uncoupling, the crank is rotatable about the central axis of the driving shaft without rotation of this driving shaft.

8 Claims, 3 Drawing Figures

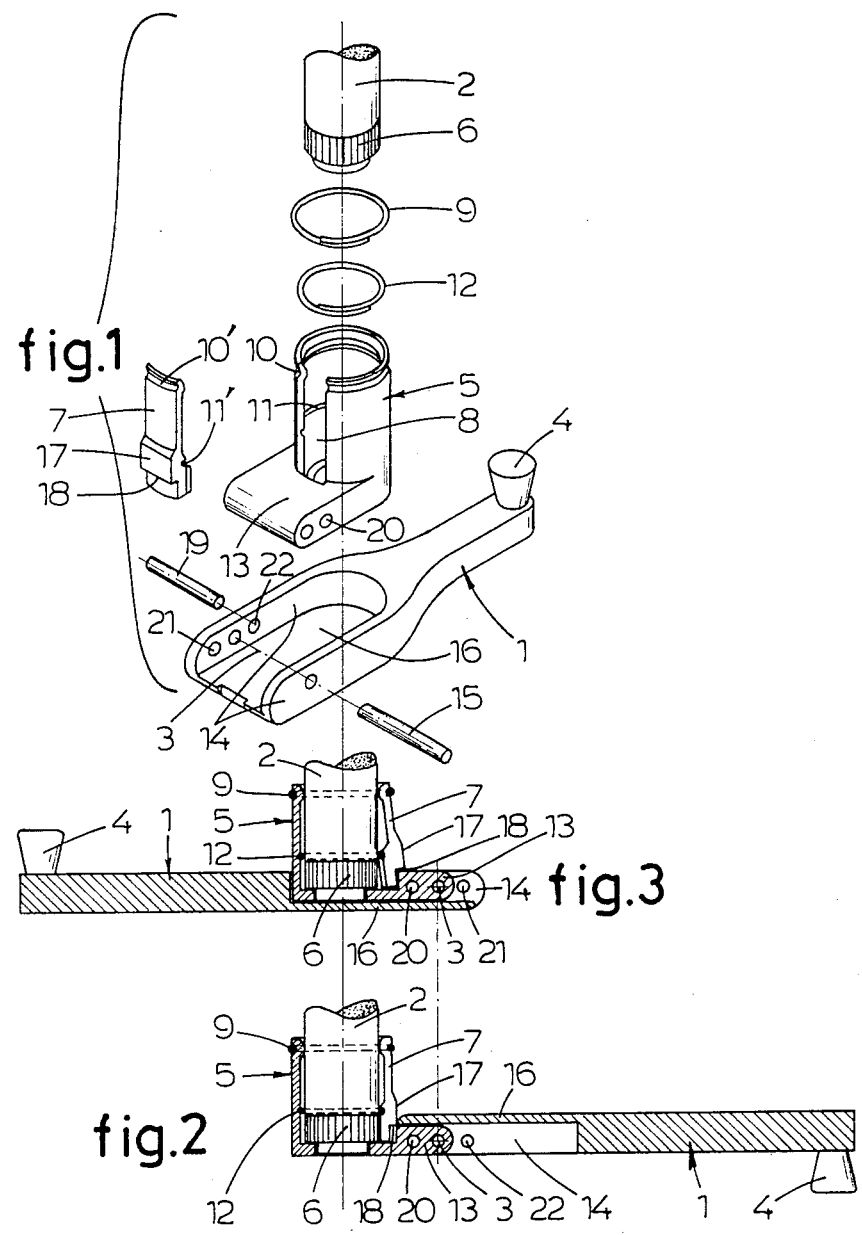

CRANK DEVICE FOR AN OPEN ROOF CONSTRUCTION FOR A VEHICLE

The invention relates to a crank device comprising a crank and adapted to rotate an at least approximately vertical driving shaft, which may actuate a displaceable panel of an open roof construction for a vehicle.

In a known embodiment of such a crank device, the end of the crank which is provided with an operating knob on the lower side can be swung upwardly in one specific position, where a recess is provided in the fixed roof of the vehicle for receiving the crank. In this way the danger that passengers can knock their heads against the crank is practically removed.

However, this known embodiment has the disadvantage, that the driving shaft has to be capable to carry out a free stroke of practically 360°, without the panel being moved, in order to be able to bring the crank in its correct position underneath the recess in each position of the panel.

It is an object of the present invention to provide a crank device, wherein this disadvantage is eliminated in an efficient way.

For this purpose the crank device according to the invention is characterized in that a coupling member is mounted between the crank and the driving shaft and that, after uncoupling, the crank is rotatable about the central axis of the driving shaft without rotation of this driving shaft.

In this manner it is achieved that the crank, after uncoupling, can always be rotated into its correct position without a free stroke of the driving shaft being necessary.

According to a favourable embodiment of the invention the crank can be pivoted about an at least substantially horizontal axis through approximately 180° between an operating position, in which an operating knob of the crank projects downwardly and a rest position, in which this operating knob is directed upwardly, while the crank can be arrested in both positions and is uncoupled with respect to the driving shaft during its pivotal movement from the operating position to the rest position, whilst the crank is coupled with respect to the driving shaft during its pivotal movement from the rest position to the operating position.

In this construction the uncoupling and the coupling of the crank with respect to the driving shaft may take place near the operating position of the crank.

In this manner it is possible to pivot the crank slightly about the at least approximately horizontal shaft, until uncoupling with respect to the driving shaft has taken place, to subsequently rotate the crank about the central axis of the driving shaft to the desired position and to thereafter further pivot the crank about the at least approximately horizontal shaft to its position of rest, in which the operating knob is received in the recess.

In a constructively attractive embodiment of the invention the crank, which is pivotable about the at least approximately horizontal axis, is connected to a housing, which is mounted on the driving shaft and which, in the uncoupled position of the crank, is rotatable about the central axis of the driving shaft with respect to this driving shaft, the driving shaft comprising a tooth ring, which co-operates with a coupling member, which is connected with the housing in such a manner, that this coupling member follows the rotating movement of the housing about the central axis of the driving shaft, but can be displaced with respect to this housing between a coupled position, in which the crank, which is in its operating position, keeps the coupling member in engagement with the tooth ring through an opening in the housing, and an uncoupled position, in which the crank is pivoted about the at least substantially horizontal axis out of the operating position and has released the coupling member, whereupon this coupling member is brought out of engagement with the tooth ring by means of spring pressure.

In this construction after the coupling member is released by the crank, this coupling member may be pressed with its lower portion against the inner side of the housing by means of the spring pressure.

In a very simple embodiment a spring ring is received in an external, at least approximately horizontal groove of the housing and extends in an external, at least approximately horizontal groove in the coupling member at the location of the opening in the housing, the coupling member being pivotable about this spring ring.

Further, a second spring ring may be received in the housing, which second spring ring loads the coupling member in the direction of the uncoupled position.

According to a preferred embodiment of the crank device according to the invention the housing comprises a lower side member, on which the crank is journalled with a forked end portion, which embraces the lower portion of the housing as well as this side member in the rest position, while the forked end portion of the crank is closed by a push-wall on the side remote from the operating knob, which push-wall is in engagement with the coupling member in the operating position of the crank, the co-operating arresting means for arresting the crank in the operating position and in the rest position being mounted in this forked end portion of the crank on the one hand and in the side member of the housing on the other hand, whilst the coupling member in its uncoupled position rests against the inner side of this side member.

The invention will hereinafter be elucidated with reference to the drawing, which shows an embodiment by way of example of the crank device according to the invention.

FIG. 1 is an exploded view of an embodiment of the crank device according to the invention.

FIGS. 2 and 3 are vertical cross-sections of the parts according to FIG. 1 in the assembled position, showing the operating position and the rest position, respectively, of the crank.

The drawing shows a crank device for an open roof construction for a vehicle, which is provided with a movable panel (not shown).

This crank device comprises a crank 1 with which a vertical driving shaft 2 can be rotated in order to displace the panel in a manner not shown. To this end the driving shaft 2 may carry an upper gear wheel, with which push and pull cables are in engagement, which may displace the panel.

The crank 1 can be pivoted about a horizontal axis 3 through approximately 180° between an operating position, in which an operating knob 4 of the crank 1 projects downwardly (FIG. 2) and a rest position, in which this operating knob 4 is directed upwardly (FIG. 3) and is received in a recess.

The crank 1 can be arrested in both positions in a manner to be described hereinafter and is uncoupled with respect to the driving shaft 2 during its pivotal movement from the operating position to the rest position, while the crank 1 is coupled again with respect to the driving shaft 2 during the pivotal movement from the rest position to the operating position.

This uncoupling and coupling of the crank 1 with respect to the driving shaft 2 takes place near the operating position of the crank 1.

The crank 1 which is pivotable about the horizontal axis 3, is connected to a housing 5, which is mounted on the driving shaft 2. In the uncoupled position of the crank 1 with respect to the driving shaft 2 the housing 5 may rotate with respect to this driving shaft 2 about the central axis of this driving shaft 2.

The driving shaft 2 comprises a lower tooth ring 6, which co-operates with a coupling member 7, which is provided with one or more teeth. The coupling member 7 is connected with the housing 5 in such a manner, that this coupling member 7 follows the rotating movement of the housing 5 about the central axis of the driving shaft 2, but can be displaced with respect to this housing 5 between a coupled position (FIG. 2), in which the crank 1, which is in the operating position, keeps the coupling member 7 in engagement with the tooth ring 6 through an opening 8 in the housing 5, and an uncoupled position, in which the crank 1 is pivoted about the horizontal axis 3 out of the operating position and has released the coupling member 7, so that this coupling member 7 is brought out of engagement with the tooth ring 6 by means of spring pressure (FIG. 3).

An open spring ring 9 with overlapping ends is received in an external, horizontal groove 10 of the housing 5 and extends in an external horizontal groove 10' in the coupling member 7 at the location of the opening 8 in the housing 5. The coupling member 7 can make a pivotal movement about this spring ring 9 when being displaced from the coupled position to the uncoupled position and vice versa.

Further, an open spring ring 12 with overlapping ends is received in an internal horizontal groove 11 in the housing 5 and in an internal horizontal groove 11' in the coupling member 7. This open spring ring 12 is mounted around the driving shaft 2 above the tooth ring 6 and loads the coupling member 7 in the direction of the uncoupled position.

As appears in particular from FIG. 1, the housing 5 comprises a lower side member 13, on which the crank 1 is journalled with a forked end portion 14, which embraces the lower portion of the housing 5 as well as this side member 13 in the rest position. A pivot shaft 15, which forms the horizontal pivot axis 3, extends through both this forked end portion 14 and the side member 13 of the housing 5.

The co-operating arresting means for arresting the crank 1 in the operating position and in the rest position respectively, are mounted in this forked end portion 14 of the crank 1 on the one hand and in the side member 13 of the housing 5 on the other hand.

In its uncoupled position the coupling member 7 rests against the inner side of the side member 13 of the housing 5.

On the side remote from the operating knob 4 the forked end portion 14 of the crank 1 is closed by a pushwall 16, which in the operating position of the crank 1 (FIG. 2) is in engagement with the coupling member 7.

Further, it can be seen from FIG. 1 that the opening 8 in the housing 5 is constructed as a slot, which extends from the lower side member 13 until the upper edge of the housing 5 and which is practically completely closed by the coupling member 7.

On its outer side the coupling member 7 has a thickened portion 17 provided with an at least approximately horizontal lower shoulder 18, which is positioned immediately above the lower side member 13 of the housing 5 in the uncoupled position (FIG. 3), while the push-wall 16 of the crank 1 engages this thickened portion 17 of the coupling member 7 in the operating position (FIG. 2).

FIG. 2 shows the operating position of the crank 1, in which the crank 1 is coupled with the driving shaft 2. In this position the push-wall 16 of the crank 1 exerts pressure on the thickened portion 17 of the coupling member 7, so that the teeth of the coupling member 7 are in engagement with the tooth ring 6.

In this operating position of the crank 1 the panel can be displaced by rotating the crank 1 about the vertical central axis of the driving shaft 2. In this operating position no free stroke is present between the crank 1 and the panel.

In the operating position the crank 1 is arrested by an arresting pin 19, which is received in a bore 20 of the side member 13 and which comes into engagement with a first arresting opening 21 in the forked end portion 14 of the crank 1.

When the crank 1 has to be displaced to the rest position according to FIG. 3, this crank 1 is first uncoupled with respect to the driving shaft 2 by pivoting the crank 1 downwardly to some extent, so that the push-wall 16 of the crank 1 comes out of engagement with the thickened portion 17 of the coupling member 7 and this coupling member 7 can be displaced outwardly to some extent under the influence of the lower spring ring 12, until the lower portion of the coupling member 7 comes to rest against the inner side of the side member 13. Subsequently the crank 1 is further rotated about the central axis of the driving shaft 2, until the crank 1 has reached its correct position, whereafter the crank 1 is further pivoted about the horizontal axis 3 (the pivot shaft 15) until the crank 1 is in the rest position according to FIG. 3, wherein the operating knob 4 is received in the recess in the fixed roof and in which the arresting pin 19 is in engagement with the second arresting opening 22 in the forked end portion 14 of the crank 1.

Of course it is also possible, in order to bring the crank 1 from the operating position into the rest position, to first pivot the crank 1 through almost 180° about the horizontal axis 3 and to thereafter carry out the rotational movement of the crank 1 about the central axis of the driving shaft 2.

The invention is not restricted to the embodiment shown in the drawing by way of example, which may be varied in several ways within the scope of the invention.

I claim:

1. Crank device for actuating a displaceable panel of an open roof construction for a vehicle, said device comprising:
   a crank for rotating an at least approximately vertical driving shaft, said crank being pivotable about an at least substantially horizontal axis through approximately 180° between an operating position, in which an operating knob of said crank projects downwardly, and a rest position, in which said operating knob is directed upwardly, said crank being able to rest in both said rest and operating positions, said crank being uncoupled from said driving shaft during the pivotal movement of said crank from the operating position to the rest position and said crank being coupled to said driving shaft during the pivotal movement of said crank from the rest position to the operating position;

a housing, to which said crank is connected, mounted around said driving shaft, said housing being rotatable about the central axis of said driving shaft when said crank is uncoupled;

a coupling member connected to said housing so that said coupling member follows the rotating movement of said housing about the central axis of said driving shaft, said coupling member being displaceable with respect to said housing between a coupled position, in which the crank in the operating position keeps the coupling member in engagement with a tooth ring through an opening in the housing, and an uncoupled position, in which the crank is pivoted about the at least substantially horizontal axis out of the operating position and has released the coupling member;

spring means for pressing the lower portion of said coupling member against the inner side of an exterior portion of the housing, said exterior portion being adjacent the opening that receives the coupling member.

2. Crank device according to claim 1, wherein the uncoupling and the coupling of the crank with respect to the driving shaft take place near the operating position of the crank.

3. Crank device according to claim 1, wherein after the coupling member is released by the crank, this coupling member is pressed with its lower portion against the inner side of the housing by means of the spring pressure.

4. Crank device according to claim 1, wherein a spring ring is received in an external, at least approximately horizontal groove of the housing and extends in an external, at least approximately horizontal groove in the coupling member at the location of the opening in the housing, the coupling member being pivotable about this spring ring.

5. Crank device according to claim 4, wherein a second spring ring is received in the housing, which second spring ring loads the coupling member in the direction of the uncoupled position.

6. Crank device according to claim 5, wherein the housing comprises a lower side member, on which the crank is journalled with a forked end portion, which embraces the lower portion of the housing as well as this side member in the rest position, while the forked end portion of the crank is closed by a push-wall on the side remote from the operating knob, which push-wall is in engagement with the coupling member in the operating position of the crank, the co-operating arresting means for arresting the crank in the operating position and in the rest position being mounted in this forked end portion of the crank on the one hand and in the side member of the housing on the other hand, whilst the coupling member in its uncoupled position rests against the inner side of this side member.

7. Crank device according to claim 6, wherein the opening in the housing is constructed as a slot, which extends from the lower side member until the upper edge of the housing and which is practically completely closed by the coupling member.

8. Crank device according to claim 7, wherein the coupling member has a thickened portion on its outer side, provided with an at least approximately horizontal lower shoulder, which is positioned above the side member of the housing in the uncoupled position while the push-wall of the crank engages this thickened portion of the coupling member in the operating position.

* * * * *